United States Patent
Jia et al.

(10) Patent No.: US 10,145,727 B2
(45) Date of Patent: Dec. 4, 2018

(54) METHOD AND STRUCTURE FOR DIMINISHING SIGNAL INTERFERENCE OF TRANSMISSION PATH OF OPTICAL FIBRE INTERFERENCE SYSTEM

(71) Applicant: FUDAN UNIVERSITY, Shanghai (CN)

(72) Inventors: Bo Jia, Shanghai (CN); Qian Xiao, Shanghai (CN); Yuan Wu, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 15/028,903

(22) PCT Filed: Oct. 10, 2014

(86) PCT No.: PCT/CN2014/088327
§ 371 (c)(1),
(2) Date: Apr. 12, 2016

(87) PCT Pub. No.: WO2015/051759
PCT Pub. Date: Apr. 16, 2015

(65) Prior Publication Data
US 2016/0252341 A1    Sep. 1, 2016

(30) Foreign Application Priority Data

Oct. 12, 2013 (CN) .......................... 2013 1 0473811

(51) Int. Cl.
*G01H 9/00* (2006.01)
*G01D 5/353* (2006.01)
(Continued)

(52) U.S. Cl.
CPC ......... *G01H 9/006* (2013.01); *G01B 9/02058* (2013.01); *G01D 5/35306* (2013.01);
(Continued)

(58) Field of Classification Search
None
See application file for complete search history.

(56) References Cited

U.S. PATENT DOCUMENTS 4,442,750 A * 4/1984 Bowley ............... G10H 1/0033
250/227.19
4,964,727 A    10/1990 Huggins
(Continued)

FOREIGN PATENT DOCUMENTS

CN    101013025    8/2007
CN    101561536    10/2009
(Continued)

OTHER PUBLICATIONS

K. Su et al., "All-fiber Audio Transmission System and the Security," Journal of Optoelectronics—Laser, vol. 16, No. 12, Dec. 2005 (four pages, including English abstract).
(Continued)

*Primary Examiner* — Michael Stahl
(74) *Attorney, Agent, or Firm* — Hamre, Schumann, Mueller & Larson, P.C.

(57) ABSTRACT

A method for diminishing the signal interference of a transmission path of an optical fiber interference system, belonging to the technical field of optical fiber sensing. A wavelength division multiplexer (19) is connected in series to the end of an induced optical fiber, a wavelength component (λ2) is separated from an operating path by means of the wavelength division multiplexer (19) so as to measure a signal picked up by a transmission path, and the signal is removed from overall interference sensing signals by taking same as a reference, thereby obtaining a target measurement signal. Also provided is a structure for diminishing the signal interference of a transmission path of an optical fiber interference system. The method and the structure are simple; moreover, the device connected to the end of an induced
(Continued)

optical fiber is passive, so that power supply is not required, and it is easy to implement. The present invention can be used for a sensing structure with a single measurement point and can be used in a sensing structure with a plurality of discontinuous measurement points as well.

9 Claims, 3 Drawing Sheets

(51) Int. Cl.
*G01B 9/02* (2006.01)
*G02B 6/293* (2006.01)
*H04R 23/00* (2006.01)

(52) U.S. Cl.
CPC ....... *G01D 5/35387* (2013.01); *G02B 6/2938* (2013.01); *G02B 6/29347* (2013.01); *H04R 23/008* (2013.01)

(56) References Cited

U.S. PATENT DOCUMENTS

| | | | |
|---|---|---|---|
| 5,068,528 A | | 11/1991 | Miller et al. |
| 5,258,614 A | * | 11/1993 | Kidwell ............... G01K 11/32 250/227.14 |
| 5,754,293 A | * | 5/1998 | Farhadiroushan ............ G01D 5/35383 356/478 |
| 6,522,797 B1 | * | 2/2003 | Siems ................ G01H 3/005 250/227.14 |
| 9,255,821 B1 | * | 2/2016 | Miyamoto ............... G01J 9/02 |
| 2007/0024857 A1 | * | 2/2007 | Menezo ............... G01D 5/266 356/478 |
| 2014/0050473 A1 | * | 2/2014 | Johnson ............ H04B 10/0791 398/20 |

FOREIGN PATENT DOCUMENTS

| | | |
|---|---|---|
| CN | 102064884 | 5/2011 |
| CN | 102117525 | 7/2011 |
| CN | 103323040 | 9/2013 |
| CN | 103499356 | 1/2014 |
| DE | 2903821 | 8/1980 |

OTHER PUBLICATIONS

International Search Report for international application No. PCT/CN2014/088327, dated Jan. 13, 2015 (6 pages, including English translation).

* cited by examiner (a)

(b)

METHOD AND STRUCTURE FOR DIMINISHING SIGNAL INTERFERENCE OF TRANSMISSION PATH OF OPTICAL FIBRE INTERFERENCE SYSTEM

TECHNICAL FIELD

The present invention belongs to the field of optical fiber sensing technology, in particular eliminate signal interference of transmission path of optical fiber interference system.

BACKGROUND

With the development of optical fiber sensing technology, application of optical fiber sensing range is more wide, the optical fiber is sensor element or transmission path. In some constructions, some fiber, from the point of functional design, just for light transmission, but form the point of principle of the structure, it has an ability to sense the physical quantities outside world. For example, FIG. 1 is an optical fiber sensing device for voice transmission (Reference: Su Ke, Jia Bo and so on, all-fiber audio transmission system and the security, optoelectronics • Laser [J], 12, 2005), wherein, 1,2,3,4,5 are ports of 3*3 coupler, 6,7,8 are ports of 2*2 coupler, 9 is a transmission optical fiber, 10 is coated with a highly reflective end surface the rate of the Al film microphone; 3*2*3 coupler and the coupler 2, optical fiber delay line, the transmission fiber 9 and a highly reflective Al film interference structure intact. In this configuration, there are two-way optical transmission paths interfere with each other, respectively:

$$1\to4\to6\to8\to9\to10\to9\to8\to7\to5\to2(3) \qquad \mathrm{I}$$

$$1\to5\to7\to8\to9\to10\to9\to8\to6\to4\to2(3) \qquad \mathrm{II}$$

Wherein, "→" indicates the direction of beam propagation. The structure belongs to a single feedback structure: two light transmitting direction opposite to interfere, from the output port 8 of the optical transmission along the optical fiber 9 to the end, the feedback means after the action (in this case, having a reflective film microphone 10), back to the optical fiber 9, the optical fiber 9 along the reverse transfer. Apparatus shown in FIG. 1, the sensing element for the Al film—when sensing sound, it will produce a corresponding vibration; function 9 transmission fiber for transmitting only the Al film reflected light from the function, the only transmission, but not for induction. However, constituting interference from the structure, the transmission fiber every point, have the ability to external vibration sensor 9, that is, when the vibration caused by external optical fiber transmission occurs at a point 9 on the corresponding physical changes, interference signal will produce a corresponding change. 9 transmission fiber sensing signal is superimposed on the sensor signal with the Al film, Al film interference signals induced, therefore, signal transmission fiber 9 sensing harmful signals, from the perspective of system functions, it is undesirable for.

Thus, in practice, in order to reduce sensing functions have, but only as a function of the optical fiber transmission pick up disturbing signals along its layout, I hope this part of the fiber is protected, placed in a relatively quiet environment. This solution obviously increases the complexity of the optical fiber laid. Moreover, in some applications, only use already laid optical fiber (cable) as a transmission path, when this part of the environment in which the cable is difficult to meet the desired state of the environment, the sensing performance of the system greatly reduced, or even not work properly.

SUMMARY OF THE INVENTION

Object of the present invention to provide a method for transmitting optical fiber sensor having an optical fiber sensing signals on the pick-up path measuring system of the reduction, a method referred to as an optical fiber transmission path interferometer signal interference mitigation.

The present invention provides method for diminishing signal interference of transmission path of optical fiber interference system, characterized by:

a WDM is used along optical fiber transmission path in the optical fiber interference system to construct the original optical fiber transmission path and a new optical fiber transmission path;

the new optical fiber transmission path have a optical fiber path with sensing capability and only used for transmission, does not include the sensing unit, and has a interference structure similar to the original optical fiber transmission path;

a portion of wavelength component is separated from the original optical fiber path by the action of WDM to independently extract signals picked up by transmission path optical fiber, reference the signals to separate the target signal interfered by signals picked up by transmission path optical fiber.

The specific content of the present invention is further described below.

Conducted utilizing wavelength division multiplexer fiber path local connections shown in FIG. 2,3. Optical link connection mode optical sensing unit 2 is connected to the middle of the transmission fiber, the sensing unit 3 is connected at the end of the transmission fiber.

According to FIG. 2, when the sensing unit connect in the middle of the transmission optical fiber, sensing unit 12 is connected between the first transmission optical fiber 11 and a second transmission optical fiber 13, the sensing unit 12 have two ports 12a, 12b; now increasing two WDM 14, 15, a first WDM 14 have a combined wave port 14a and two partial wave ports 14b, 14c, the output wavelengths are λ1, λ2 respectively; a second WDM 15 has a combined wave port 15a and two partial wave ports 15b, 15c, the output wavelengths are λ1, λ2 respectively; the first WDM 14 is connected between the first transmission optical fiber 11 and the sensing unit 12, the second WDM 15 is connected between the sensing unit 12 and the second transmission optical fiber 13; the first WDM 14, the second WDM 15, the sensing means 12 construct a multiplexing unit 16A; wherein the transmission optical fiber 11 is connected with the combined wave port 14a of the first WDM 14, a first partial wave port 14b of the first WDM 14 is connected with a first port 12a of the sensing unit 12, a second partial wave port 14c of the first WDM 14 is connected with a second partial wave port 15c of the second WDM 15, a second port 12b of the sensing unit 12 is connected with a first partial wave port 15b of the second WDM 15, the combined wave port 15a of the second WDM 15 is connected with the transmission optical fiber 13; the light with wavelength λ1 has passed along the original transmission path optical fiber 11→sensing unit 12→transmission optical fiber 13, while light with wavelength λ2 avoids the sensing unit 12, directly transmitted to the transmission optical fiber 13 from the transmission optical fiber 11.

According to FIG. 3, a WDM 19 have a combined wave port 19a and two partial wave ports 19b, 19c, the output wavelengths are λ1, λ2 respectively; a structural unit 20 for constructing the complete interference construction is connected at the end of the optical fiber, the WDM 19 is series connected between a transmission optical fiber 17 and a sensing means 18; wherein the transmission optical fiber 17 is connected with the combined wave port 19a of the first WDM 19, a first partial wave port 19b of the WDM 19 is connected with the sensing unit 18, a second partial wave port 19c of the WDM 19 is connected with the structural unit 20, the WDM 19, the sensing unit 18, the structural unit 20 construct a multiplexing unit 16B.

From the perspective of the interferometer structure formed, the structural unit 20 has the functions similar to the sensing unit 18.

When the interference structure, such as when using single feedback structure, light enters the sensing unit 18, the after effect of the feedback device inside the sensor unit 18, an optical output port through the final sensing unit 18, re-enter the transmission fiber, in which under cases, the use of the present invention, the structural unit 20 can be 21, (C), the second sub-feedback means connected to a wavelength division multiplexer 19 shown in FIG. 3. the wave feedback means 21 and the port 19c. Thus, with the method of the present invention, the wavelength λ1 light is still equivalent to the transmission fiber 17→sensing unit 18→transmission fiber sensing unit 17 along a transfer path of the original transmission, and wavelength λ2 of the light sensing unit is avoided, equivalent to 17 directly transmitted by the transmission optical fiber transmission fiber 17→transmission fiber 17.

In the sensing light path, the light sensing unit is located within walking path is very short, with a total fiber interferometer beam path length compared to walking, is negligible, the interference term P1 interference output signal wavelength λ1 formation can be expressed as:

$$P_1 = k_1 \cos\left(\sum_i \phi_{sen}(\lambda_1, i) + \sum_j \phi_{path}(\lambda_1, j) + \phi_0(\lambda_1)\right) \quad (1)$$

Wherein, $\phi_{sens}(\lambda_1,i)$ is the wavelength λ1 when the i-th sensing unit senses the external physical changes resulting phase difference signal, $\phi_{path}(\lambda_1,j)$ is a phase difference signal wavelength λ1 to paragraph j transmission fiber sensor to external perturbations generated by the system for the last wavelength the initial phase, $\phi_0(\lambda_1)$ is a constant, and the amount of system parameter, is constant. Interference term interference signal P2 output wavelength λ2 formed can be expressed as:

$$P_2 = k_2 \cos\left(\sum_j \phi_{path}(\lambda_2, j) + \phi_0(\lambda_2)\right) \quad (2)$$

Wherein, $\phi_{path}(\lambda_2, j)$ is when the wavelength is λ2 paragraph n transmission fiber sensed phase difference signal generated by the external disturbance, $\phi_0(\lambda_2)$ is the wavelength λ2 is the initial phase of the system, is a constant, and $k_2$ is the amount of system parameter, is constant.

By optical interferometry techniques phase solution method, $\phi_1$, $\phi_2$ can be obtained:

$$\phi_1 = \sum_i \phi_{sen}(\lambda_1, i) + \sum_j \phi_{path}(\lambda_1, j) \quad (3)$$

$$\phi_2 = \sum_j \phi_{path}(\lambda_2, j) \quad (4)$$

λ1 present invention is constructed, lambda 2 travel route, from the perspective of the interference of light, they are very similar, the following relationship exists:

$$\phi_{path}(\lambda_1,j) \approx K\phi_{path}(\lambda_2,j) \quad (5)$$

Where K is the operating wavelength lambda] 1, the amount of associated λ2, is a known constant, therefore:

$$\phi_1 = \sum_i \phi_{sen}(\lambda_1, i) + K\phi_2 \quad (6)$$

United vertical (5), (6), measuring the amount of the target $$\phi_{1aim} = \sum_i \phi_{sen}(\lambda_1, i)$$

can be obtained, and therefore, with the corresponding signal processing means, the target may be separated measurement signals picked subtractive interference information transmission path.

When the sensor structure shown in the optical path of the sensor system is shown in FIG. 4 (a) of the Sagnac ring interferometer structure, the structure of the present invention is constructed as shown in FIG. 4 (b) below. 4, the optical splitter 22, 23 is composed of wavelength division multiplexer splitter unit; a light source from the optical splitter input port 22, output port also interference signal from the optical splitter 22. (B) (b) according to the method shown in FIG. 4 of the present invention, FIG. 2; FIG. 4 (a), the loop in series in a plurality of sensing unit 12, and the optical splitter 22 to form a complete loop interference structure, part of the sensing unit 12 is connected to the multiplexing unit 16A. In FIG. 4 (b), there are two loops, a wavelength λ1 walking path that includes a transmission fiber and a sensor unit; the other is a wavelength λ2 walking path that contains only the transmission fiber, no pass sense unit. Interference signal wavelength λ1 and λ2 formed, all port output from the optical splitter 22, and then by splitting unit 23 after the two separate wavelengths, respectively, to obtain the wavelength λ1, λ2 interference signal is formed.

When a single optical sensor shown in the structure of the sensing system as shown in (a) feedback interference structure, the structure of the present invention is constructed as shown in FIG. 5 (b) below. 5, 24, 26 is an optical splitter, fiber delay 25, a spectroscopic unit 27 is composed of wavelength division multiplexer; light from the optical splitter input port 24, and also the interference signal from the optical splitter 24 port output. FIG. 5 (a), the optical fiber transmission path in series with a plurality of sensing unit 12, the transmission at the end of the fiber path connected to a sensing unit 12, optical splitter 24, 26, and 25 are the sensing fiber delay unit 12, the sensing unit 18 constitutes a complete interference structure; FIG. 5 (b) in accordance with the present invention, FIG. 2 (b), 3 (b) the method shown in the portion of the sensing unit 12 is connected to the corresponding multiplexing unit 16A, the sensing unit 18 is connected to the multiplexing unit 16B. In FIG. 5 (b), there are two single feedback path, a wavelength λ1 walking path that includes a transmission fiber and a sensor unit; the other is a wavelength λ2 walking path that contains only the transmission fiber, no sensing unit. Interference signal wavelength λ1 and λ2 formed, are optical splitter 24 from the output port, and then splitting unit 27 after the two separate wavelengths, respectively, to obtain the wavelength λ1, λ2 interference signal is formed.

The light injected into the optical fiber optical path structure of the present invention can be provided by an independent source, or the light source may be a combination of two or more different wavelengths of light through the WDM; WDM can have two splitting ports or a plurality of splitting ports.

Advantage of the present invention is that it can effectively eliminate the impact of backscattered (reflected) light in single core optical fiber sensing light path, the useful information is extracted from the signal of serious disturbances, which significantly improves the measurement of distance, enhance adaptability to the line of interference measurement system. The technology uses a WDM to obtain interference signal formed by scatter light, so the structure of this method is simple and easier to implement.

Sensor measuring structure of the present invention can be used in a single point, the sensor can also be used to structure a plurality of non-continuous measuring point in.

Figure 1:
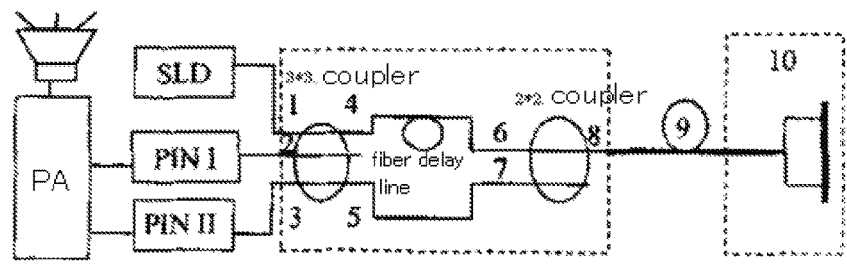
FIG. 1 is an Optical fiber sensing apparatus for transmitting voice.
Figure 2:
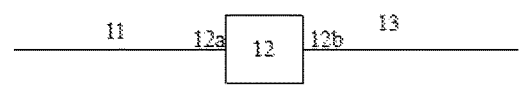
FIG. 2 is an Optical sensing unit is connected to the middle of the transmission fiber connections. Wherein, (a) the original connection, (b) using the method of the present invention is illustrated in connection.
Figure 2:
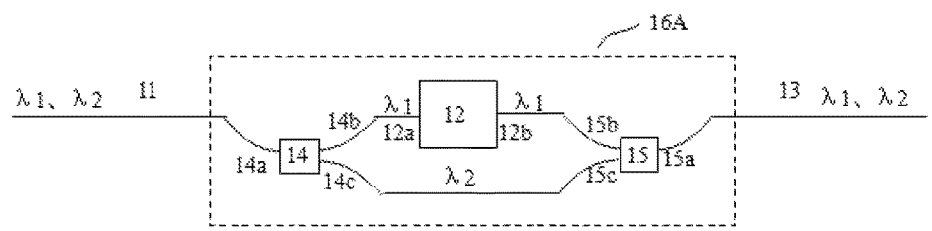
Figure 3:
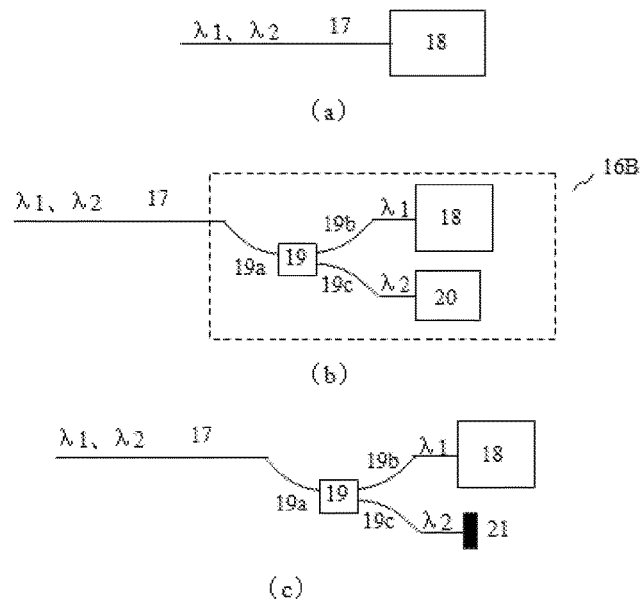
FIG. 3 is an Optical sensing unit is connected to the end of the transmission fiber connections. Wherein, (a) the original connection, (b) using the method of the present invention is illustrated in connection.
Figure 4:
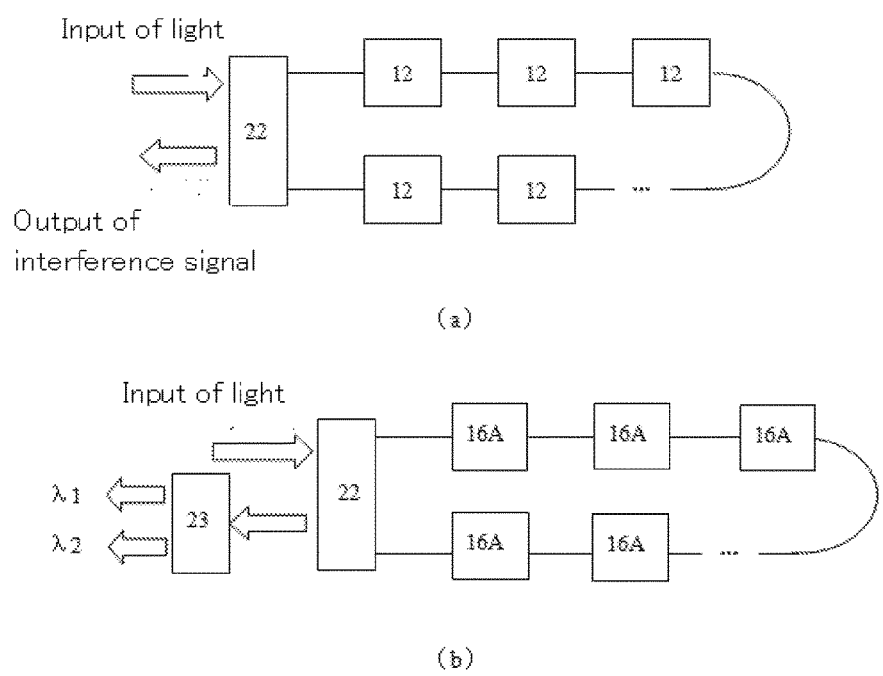
FIG. 4 is an Optical sensor system for sensing structure Sagnac ring interferometer structure shown. Wherein, (a) the original structure, (b) for the introduction of the present invention achieves a structure.
Figure 5:
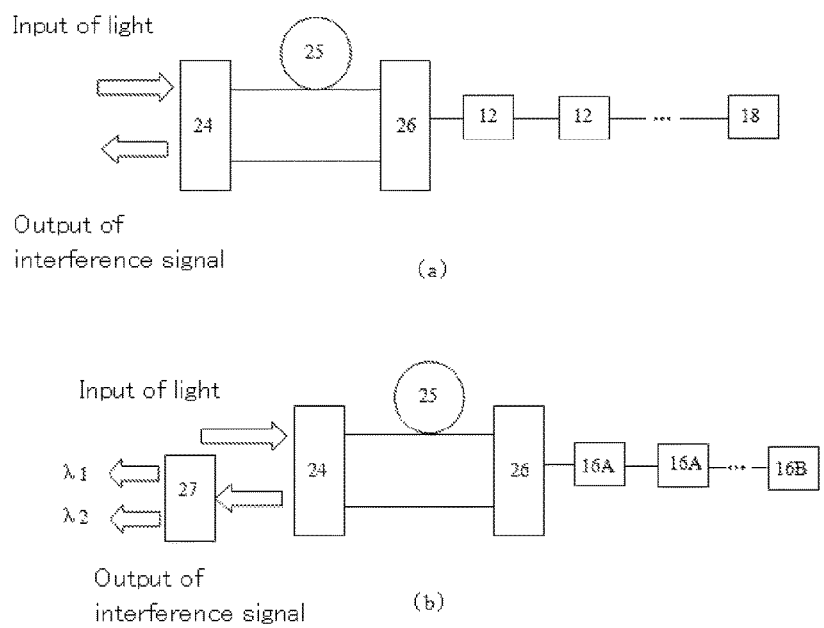
FIG. 5 is an Optical sensor system for sensing structure single feedback interference structure icon. Wherein, (a) the original structure, (b) for the introduction of the present invention achieves a structure.

REFERENCE NUMERAL 1,2,3,4,5 respectively 3*3 coupler port, 2*6,7,8 port coupler 2, the transmission optical fiber 9, 10 is coated with a highly reflective end surface of the Al film a microphone; a transmission optical fiber 11, 13, 12 of the optical fiber 11, 13 is connected between the sensing unit, 12a, 12b to the port 12 of the sensing unit; wavelength division multiplexer 14, 14a of a wavelength division multiplexer 14 the multiplexer (common), 14b, 14c of the wavelength demultiplexing ports, respectively, output λ1, λ2; 15 as wavelength division multiplexer, 15a multiplexer is a wavelength division multiplexer (common) 15, 15b, 15c for the sub-port wave output wavelength respectively λ1, λ2; 16A as wavelength division multiplexers 14 and 15, a multiplexing unit 12 sensing unit formed; transmission optical fiber 17, 18 of the sensing unit; 19 wavelength division multiplexer, a wavelength division multiplexer 19a to the multiplexer 19 (common), 19b, 19c for the sub-port wave output wavelength respectively λ1, λ2; 20 is connected to the end of the fiber, for a complete a structural unit of the interference structure; feedback unit 21, 16B for the wavelength division multiplexer 19, the sensing unit 18, a multiplexing unit 20 composed of the structural unit; optical splitter 22, a wavelength division multiplexer 23 is composed of spectroscopic unit; 24,26 for the spectroscopic device, an optical fiber delay unit 25, 27 is constituted WDM splitter unit; 3 28*3 equalization fused biconical tapered single-mode fiber coupler, wherein, 28a1,28a2, 28a3 in-phase port, 28b1,28b2 to the same port; 32 for the equalization of 2*2 single-mode optical fiber fused biconical tapered coupler, wherein, 32a1, 32a2, in-phase port, 32b1,32b2 to the same port; 30, 31 are all WDM, a three-port device that has two ports splitting, 29a to reuse port 29, 29b, 29c for the splitting port 29, 30a to reuse port 30, 30b, 30c of the spectral port 30, 31a to reuse port 31, 31b, 31c of the spectral port 31; 33 as the probe 34 is freely movable surface having a reflecting function, a reflecting mirror 35.

Embodiment

Figure 6:
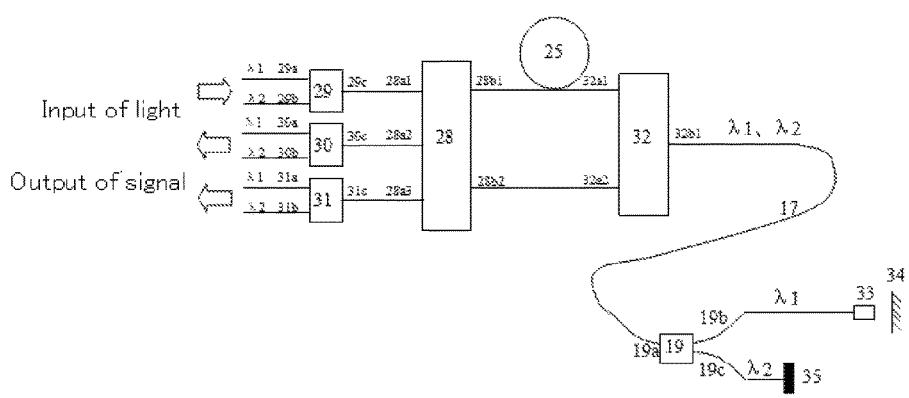
FIG. 6 is using a single feedback free movement of surface structure measuring method of the present invention constituted.

FIG. 6 is a single use feedback interferometer structure free surface of the optical structure vibration measurements. FIG. 28 is average 3*3 Optical Fiber tapered single-mode coupler, wherein, 28a1,28a2,28a3 phase for the same port, 28b1,28b2 to the same port; 32 for the equalization of 2*2 Optical Fiber pull tapered single-mode coupler, wherein, 32a1,32a2, in-phase port, 32b1,32b2 to the same port; 30, 31 are all WDM, a three-port device that has two ports spectroscopic multiplexing port 29a is 29, 29b, 29c for the 29 spectral port, 30a to 30 multiplexing port, 30b, 30c of the spectral of the port 30, 31a to 31 multiplexing port, 31b, 31c for the 31 spectral port; probe 33, 34 is freely movable surface having a reflecting function, a reflecting mirror 35.

In this embodiment, along the transmission path 17 is transmitted to the probe light output by the probe 33, is incident to the free movement of surface 34, 34 after reflection by the free movement of surface, light re-enter the light probe 33 along the optical fiber path 17 original Road Back. In this measurement configuration, the sensor element can be seen as a combination of the free movement of the probe 33 and the surface 34, 17 although the ability to pick up external disturbance signal transmission path, but hopefully this is only part of the fiber transmission function to do so, according to the method of the invention, at the end, the use of wavelength division multiplexer 19, the light is divided into two portions wavelengths λ1, λ2, λ1 walking port 19b is connected to the probe 33, a reflector port 35 is connected to walking lambda] 1.

Wavelength light source as the center, respectively λ1, λ2 light, these two wavelengths of light through the wavelength division multiplexer 29, the combined input to the port coupler 28a1; the interference signal from the output port 28a2,28a3, respectively, then the wave drop multiplexer 30,31, λ1, λ2 light components are separated, the corresponding port output. In this configuration, two light transmission path of the interference beam relative to the wavelength λ1 of:

P11:
28a1→28b1→25→32a1→32b1→17→19a→19b→33→34→
33→19b→19a→17→32b1→32a2→28b2→28a2(28a3)

P12:
28a1→28b2→32a2→32b1→17→19a→19b→33→34→33→19b→17→32b1→32a1→25→28b1→28a2
(28a3)

Light transmission path interfering two beams of wavelength λ2 is:

P21:
28a1→28b1→25→32a1→32b1→17→19a→19c→35→19c→19a→17→32b1→32a2→28b2→28a2(28a3)

P22:
28a1→28b2→32a2→32b1→17→19a→19c→35→19c→19a→17→32b1→32a1→25→28b1→28a2(28a3)

Along the two beams P21 and P22 transmitted from the interfering signals obtained pure interference signal transmission path pickup P2; along the two beams P11 and P12 transmitted from the interfering signals obtained pure transmission path P1 signal picked up by the sensing unit and signal interference measurements. In this measuring arrangement, there $$\phi_{path}(\lambda_1, j) \approx \frac{\lambda_2}{\lambda_1} \phi_{path}(\lambda_2, j) \qquad (7)$$

30, 31 from the WDM port output, using signal processing means to measure the target signal, that is, the free movement of the measurement signal is extracted surface 34.

The invention claimed is:

1. A method for diminishing signal interference of a transmission path of an optical fiber interference system, comprising:
    using a WDM along an optical fiber transmission path in the optical fiber interference system to construct an original optical fiber transmission path and a new optical fiber transmission path,
    wherein the new optical fiber transmission path has an optical fiber path with sensing capability and only used for transmission, does not include a sensing unit, and has a same interference structure as the original optical fiber transmission path, and the interference structure of the original optical fiber path is located on the same optical fiber path as the interference structure of the new optical fiber path; and
    wherein a portion of wavelength component is separated from the original optical fiber path by the action of WDM to independently extract signals picked up by transmission path optical fiber, the signals are referenced to separate a target signal interfered by signals picked up by transmission path optical fiber.

2. The method according to claim 1, wherein,
    when the sensing unit is connected in the middle of the transmission optical fiber, and if a sensing unit is connected between a first transmission optical fiber and a second transmission optical fiber, wherein the sensing unit has two ports; using two WDMs, a first WDM (14) having a combined wave port and two partial wave ports, the output wavelengths are λ1 and λ2 respectively; a second WDM having a combined wave port and two partial wave ports, and the output wavelengths are λ1 and λ2 respectively; the first WDM is connected between the first transmission optical fiber and the sensing unit, the second WDM is connected between the sensing unit and the second transmission optical fiber; the first WDM, the second WDM, and the sensing unit construct a multiplexing unit; wherein the first transmission optical fiber is connected with the combined wave port of the first WDM, a first partial wave port of the first WDM is connected with a first port of the sensing unit, a second partial wave port of the first WDM is connected with a second partial wave port of the second WDM, a second port of the sensing unit is connected with a first partial wave port of the second WDM, the combined wave port of the second WDM is connected with the second transmission optical fiber; the light with wavelength λ1 has passed along the first transmission path optical fiber→sensing unit→the second transmission optical fiber, while light with wavelength λ2 avoids the sensing unit, and is directly transmitted to the second transmission optical fiber from the first transmission optical fiber.

3. The method according to claim 1, wherein,
    when the sensing unit is connected to the end of the transmission optical fiber, a WDM having a combined wave port and two partial wave ports, the output wavelengths are λ1 and λ2 respectively; a structural unit for constructing the complete interference construction is connected at the end of the optical fiber, the WDM is connected in series between a transmission optical fiber and a sensing unit; wherein the transmission optical fiber is connected with the combined wave port of the first WDM, a first partial wave port of the WDM is connected with the sensing unit, a second partial wave port of the WDM is connected with the structural unit, and wherein the WDM, the sensing unit, and the structural unit construct a multiplexing unit.

4. The method according to claim 3, wherein, the sensing unit is a feedback device and the structural unit has an interference structure that is the same as that of the sensing unit.

5. The method according to claim 3, wherein, the structural unit is a feedback device.

6. A structure for diminishing signal interference of transmission path of optical fiber interference system, wherein:
    a WDM is used along optical fiber transmission path in the optical fiber interference system to construct an original optical fiber transmission path and a new optical fiber transmission path;
    wherein an interference structure of the original optical fiber path is located on the same optical fiber path as an interference structure of the new optical fiber path
    the new optical fiber transmission path has an optical fiber path with sensing capability and only used for transmission, does not include a sensing unit, and has a same interference structure as the original optical fiber transmission path.

7. The structure according to claim 6, wherein,
    when the sensing unit is connected in the middle of the transmission optical fiber, and if the sensing unit is connected between a first transmission optical fiber and a second transmission optical fiber, the sensing unit having two ports; the structure comprising two WDMs, wherein a first WDM has a combined wave port and two partial wave ports, the output wavelengths are λ1 and λ2 respectively; a second WDM has a combined wave port and two partial wave ports, and the output wavelengths are λ1 and λ2 respectively; the first WDM is connected between the first transmission optical fiber and the sensing unit, the second WDM is connected between the sensing unit and the second transmission optical fiber; the first WDM, the second WDM, and the sensing unit construct a multiplexing unit; wherein the first transmission optical fiber is connected with the combined wave port of the first WDM, a first partial wave port of the first WDM is connected with a first port of the sensing unit, a second partial wave port of the first WDM is connected with a second partial wave port of the second WDM, a second port of the sensing unit is connected with a first partial wave port of the second WDM, the combined wave port of the second WDM is connected with the second transmission optical fiber.

8. The structure according to claim 6, wherein, when the sensing unit is connected to in an end of the transmission optical fiber, the structure comprises: a WDM having a combined wave port and two partial wave ports, the output wavelengths are $\lambda 1$ and $\lambda 2$ respectively; a structural unit for constructing the complete interference construction is connected at the end of the optical fiber, the WDM is connected in series between a transmission optical fiber and a sensing unit; wherein the transmission optical fiber is connected with the combined wave port of the first WDM, a first partial wave port of the WDM is connected with the sensing unit, a second partial wave port of the WDM is connected with the structural unit, and wherein the WDM, the sensing unit, and the structural unit construct a multiplexing unit.

9. The structure according to claim 8, wherein, the structural unit is a feedback device.

* * * * *